United States Patent
Mullarkey

(10) Patent No.: US 6,269,451 B1
(45) Date of Patent: Jul. 31, 2001

(54) METHOD AND APPARATUS FOR ADJUSTING DATA TIMING BY DELAYING CLOCK SIGNAL

(75) Inventor: Patrick J. Mullarkey, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/032,256

(22) Filed: Feb. 27, 1998

(51) Int. Cl.$^7$ .................................................. G06F 1/04
(52) U.S. Cl. ........................... 713/401; 713/503; 713/600
(58) Field of Search ..................... 713/400, 401, 713/503, 600

(56) References Cited

U.S. PATENT DOCUMENTS

| | | | |
|---|---|---|---|
| 3,633,174 | 1/1972 | Griffin | 340/172.5 |
| 4,077,016 | 2/1978 | Sanders et al. | 331/4 |
| 4,096,402 | 6/1978 | Schroeder et al. | 307/362 |
| 4,404,474 | 9/1983 | Dingwall | 307/260 |
| 4,481,625 | 11/1984 | Roberts et al. | 370/85 |
| 4,508,983 | 4/1985 | Allgood et al. | 307/577 |
| 4,511,846 | 4/1985 | Nagy et al. | 328/164 |
| 4,514,647 | 4/1985 | Shoji | 307/269 |
| 4,524,448 | 6/1985 | Hullwegen | 375/118 |
| 4,573,017 | 2/1986 | Levine | 327/114 |

(List continued on next page.)

FOREIGN PATENT DOCUMENTS

| | | |
|---|---|---|
| 0 295 515 A1 | 12/1988 | (EP) . |
| 0 406 786 A1 | 1/1991 | (EP) . |
| 0 450 871 A2 | 10/1991 | (EP) . |
| 0 476 585 A2 | 3/1992 | (EP) . |
| 0 655 741 A2 | 5/1995 | (EP) . |

(List continued on next page.)

OTHER PUBLICATIONS

Gustavson, David B., et al., IEEE Standard for Scalable Coherent Interface (SCI), IEEE Computer Society, IEEE Std. 1596–1992, Aug. 2, 1993.
Alvarez, J. et al. "A Wide–Bandwidth Low Voltage PLL for PowerPC™ Microprocessors" IEEE IEICE Trans. Electron., vol. E–78. No. 6, Jun. 1995, pp. 631–639.
Anonymous, "Programmable Pulse Generator", IBM Technical Disclosure Bulletin, vol. 17, No. 12, May 1975, pp. 3553–3554.
Anonymous, "Pulse Combining Network", IBM Technical Disclosure Bulletin, vol. 32, No. 12, May 1990, pp. 149–151.

(List continued on next page.)

Primary Examiner—Dennis M. Butler
(74) Attorney, Agent, or Firm—Dorsey & Whitney LLP

(57) ABSTRACT

A circuit for adjusting a time when data is delivered to a data terminal with respect to an external clock signal includes a data passing circuit and a delay adjusting circuit. The delay adjusting circuit accepts a plurality of control signals each arranged to control passgates arranged in columns, with one column being controlled by a respective one of the control signals. A clock signal passes in parallel manner through a variety of delay gates, and each delay gate is coupled in series with one of the passgates. By selecting a path through desired passgates, one delay path is selected and the delay time added to the clock signal. This delayed clock signal is used to control the data passing circuit, which controls when data is output to the output terminals relative to the original clock signal. The control signals are created by selectively coupling or decoupling the control signals from a static voltage, and fuses or antifuses can be used to facilitate this coupling or decoupling.

26 Claims, 7 Drawing Sheets

U.S. PATENT DOCUMENTS

| | | | |
|---|---|---|---|
| 4,600,895 | 7/1986 | Landsman | 331/1 A |
| 4,603,320 | 7/1986 | Farago | 341/89 |
| 4,638,187 | 1/1987 | Boler et al. | 307/451 |
| 4,638,451 | 1/1987 | Hester et al. | 395/889 |
| 4,687,951 | 8/1987 | McElroy | 307/269 |
| 4,773,085 | 9/1988 | Cordell | 375/120 |
| 4,789,796 | 12/1988 | Foss | 307/443 |
| 4,818,995 | 4/1989 | Takahashi et al. | 341/94 |
| 4,893,087 | 1/1990 | Davis | 328/14 |
| 4,902,986 | 2/1990 | Lesmeister | 331/25 |
| 4,953,128 | 8/1990 | Kawai et al. | 365/194 |
| 4,958,088 | 9/1990 | Farah-Bakhsh et al. | 307/443 |
| 4,972,470 | 11/1990 | Farago | 380/3 |
| 4,984,204 | 1/1991 | Sato et al. | 365/189.11 |
| 5,020,023 | 5/1991 | Smith | 364/900 |
| 5,038,115 | 8/1991 | Myers et al. | 331/2 |
| 5,075,569 | 12/1991 | Branson | 327/407 |
| 5,086,500 | 2/1992 | Greub | 395/550 |
| 5,087,828 | 2/1992 | Sato et al. | 307/269 |
| 5,122,690 | 6/1992 | Bianchi | 307/475 |
| 5,128,560 | 7/1992 | Chern et al. | 307/475 |
| 5,128,563 | 7/1992 | Hush et al. | 307/482 |
| 5,134,311 | 7/1992 | Biber et al. | 307/270 |
| 5,150,186 | 9/1992 | Pinney et al. | 357/42 |
| 5,165,046 | 11/1992 | Hesson | 307/270 |
| 5,179,298 | 1/1993 | Hirano et al. | 307/443 |
| 5,194,765 | 3/1993 | Dunlop et al. | 307/443 |
| 5,212,601 | 5/1993 | Wilson | 360/51 |
| 5,220,208 | 6/1993 | Schenck | 307/443 |
| 5,223,755 | 6/1993 | Richley | 307/603 |
| 5,233,314 | 8/1993 | McDermott et al. | 331/17 |
| 5,233,564 | 8/1993 | Ohshima et al. | 365/230.05 |
| 5,239,206 | 8/1993 | Yanai | 307/272.2 |
| 5,243,703 | 9/1993 | Farmwald et al. | 395/325 |
| 5,254,883 | 10/1993 | Horowitz et al. | 307/443 |
| 5,256,989 | 10/1993 | Parker et al. | 331/1 A |
| 5,257,294 | 10/1993 | Pinto et al. | 375/120 |
| 5,268,639 | 12/1993 | Gasbarro et al. | 324/158 R |
| 5,272,729 | 12/1993 | Bechade et al. | 375/118 |
| 5,274,276 | 12/1993 | Casper et al. | 307/443 |
| 5,276,642 | 1/1994 | Lee | 365/189.04 |
| 5,278,460 | 1/1994 | Casper | 307/296.5 |
| 5,281,865 | 1/1994 | Yamashita et al. | 307/279 |
| 5,283,631 | 2/1994 | Koerner et al. | 307/451 |
| 5,289,580 | 2/1994 | Latif et al. | 395/883 |
| 5,295,164 | 3/1994 | Yamamura | 375/120 |
| 5,304,952 | 4/1994 | Quiet et al. | 331/1 A |
| 5,311,481 | 5/1994 | Casper et al. | 365/230.06 |
| 5,311,483 | 5/1994 | Takasugi | 365/233 |
| 5,313,431 | 5/1994 | Uruma et al. | 365/230.05 |
| 5,315,388 | 5/1994 | Shen et al. | 348/718 |
| 5,321,368 | 6/1994 | Hoelzle | 328/63 |
| 5,337,285 | 8/1994 | Ware et al. | 365/227 |
| 5,341,405 | 8/1994 | Mallard, Jr. | 375/120 |
| 5,347,177 | 9/1994 | Lipp | 307/443 |
| 5,347,179 | 9/1994 | Casper et al. | 365/230.06 |
| 5,355,391 | 10/1994 | Horowitz et al. | 375/36 |
| 5,361,002 | 11/1994 | Casper | 327/530 |
| 5,367,649 | 11/1994 | Cedar | 395/384 |
| 5,379,299 | 1/1995 | Schwartz | 370/108 |
| 5,390,308 | 2/1995 | Ware et al. | 395/400 |
| 5,400,283 | 3/1995 | Raad | 365/203 |
| 5,402,389 | 3/1995 | Flannagan et al. | 365/233 |
| 5,408,640 | 4/1995 | MacIntyre et al. | 395/550 |
| 5,410,263 | 4/1995 | Waizman | 327/141 |
| 5,416,436 | 5/1995 | Rainard | 327/270 |
| 5,416,909 | 5/1995 | Long et al. | 395/856 |
| 5,420,544 | 5/1995 | Ishibashi | 331/11 |
| 5,428,311 | 6/1995 | McClure | 327/276 |
| 5,428,317 | 6/1995 | Sanchez et al. | 331/1 A |
| 5,430,408 | 7/1995 | Ovens et al. | 327/407 |
| 5,430,676 | 7/1995 | Ware et al. | 365/189.02 |
| 5,432,823 | 7/1995 | Gasbarro et al. | 375/356 |
| 5,438,545 | 8/1995 | Sim | 365/189.05 |
| 5,440,260 | 8/1995 | Hayashi et al. | 327/278 |
| 5,440,514 | 8/1995 | Flannagan et al. | 365/194 |
| 5,444,667 | 8/1995 | Obara | 365/194 |
| 5,446,696 | 8/1995 | Ware et al. | 365/222 |
| 5,448,193 | 9/1995 | Baumert et al. | 327/156 |
| 5,451,898 | 9/1995 | Johnson | 327/563 |
| 5,457,407 | 10/1995 | Shu et al. | 326/30 |
| 5,465,076 | 11/1995 | Yamauchi et al. | 331/179 |
| 5,473,274 | 12/1995 | Reilly et al. | 327/159 |
| 5,473,575 | 12/1995 | Farmwald et al. | 365/230.06 |
| 5,473,639 | 12/1995 | Lee et al. | 375/376 |
| 5,485,490 | 1/1996 | Leung et al. | 375/371 |
| 5,488,321 | 1/1996 | Johnson | 327/66 |
| 5,489,864 | 2/1996 | Ashuri | 327/161 |
| 5,497,127 | 3/1996 | Sauer | 331/17 |
| 5,498,990 | 3/1996 | Leung et al. | 327/323 |
| 5,500,808 | 3/1996 | Wang | 365/189.05 |
| 5,506,814 | 4/1996 | Hush et al. | 365/230.03 |
| 5,508,638 | 4/1996 | Cowles et al. | 326/38 |
| 5,513,327 | 4/1996 | Farmwald et al. | 395/309 |
| 5,532,714 | 7/1996 | Knapp et al. | 345/114 |
| 5,539,345 | 7/1996 | Hawkins | 327/150 |
| 5,544,124 | 8/1996 | Zagar et al. | 365/230.08 |
| 5,544,203 | 8/1996 | Casasanta et al. | 375/376 |
| 5,552,727 | 9/1996 | Nakao | 327/159 |
| 5,555,429 | 9/1996 | Parkinson et al. | 395/800.14 |
| 5,557,224 | 9/1996 | Wright et al. | 327/156 |
| 5,557,781 | 9/1996 | Stones et al. | 395/550 |
| 5,563,546 | 10/1996 | Tsukada | 327/407 |
| 5,568,075 | 10/1996 | Curran et al. | 327/172 |
| 5,568,077 | 10/1996 | Sato et al. | 327/199 |
| 5,572,557 | 11/1996 | Aoki | 375/376 |
| 5,572,722 | 11/1996 | Vogley | 305/555 |
| 5,574,698 | 11/1996 | Raad | 365/230.06 |
| 5,576,645 | 11/1996 | Farwell | 327/94 |
| 5,577,236 | 11/1996 | Johnson et al. | 395/551 |
| 5,578,940 | 11/1996 | Dillon et al. | 326/30 |
| 5,578,941 | 11/1996 | Sher et al. | 326/34 |
| 5,579,326 | 11/1996 | McClure | 371/61 |
| 5,581,197 | 12/1996 | Motley et al. | 326/30 |
| 5,589,788 | 12/1996 | Goto | 327/276 |
| 5,590,073 | 12/1996 | Arakawa et al. | 365/185.08 |
| 5,594,690 | 1/1997 | Rothenberger et al. | 365/189.01 |
| 5,614,855 | 3/1997 | Lee et al. | 327/158 |
| 5,619,473 | 4/1997 | Hotta | 365/238.5 |
| 5,621,340 | 4/1997 | Lee et al. | 327/65 |
| 5,621,690 | 4/1997 | Jungroth et al. | 365/200 |
| 5,621,739 | 4/1997 | Sine et al. | 371/22.1 |
| 5,627,780 | 5/1997 | Malhi | 365/185.09 |
| 5,627,791 | 5/1997 | Wright et al. | 365/222 |
| 5,631,872 | 5/1997 | Naritake et al. | 365/227 |
| 5,636,163 | 6/1997 | Furutani et al. | 365/189.01 |
| 5,636,173 | 6/1997 | Schaefer | 365/230.03 |
| 5,636,174 | 6/1997 | Rao | 365/230.03 |
| 5,638,335 | 6/1997 | Akiyama et al. | 365/230.03 |
| 5,646,904 | 7/1997 | Ohno et al. | 365/233 |
| 5,652,530 * | 7/1997 | Ashuri | 326/93 |
| 5,657,289 | 8/1997 | Hush et al. | 365/230.05 |
| 5,657,481 | 8/1997 | Farmwald et al. | 395/551 |
| 5,663,921 | 9/1997 | Pascucci et al. | 365/233 |
| 5,666,322 | 9/1997 | Conkle | 365/233 |
| 5,668,763 | 9/1997 | Fujioka et al. | 365/200 |
| 5,668,774 | 9/1997 | Furutani | 365/233 |
| 5,675,274 | 10/1997 | Kobayashi et al. | 327/158 |
| 5,692,165 | 11/1997 | Jeddeloh et al. | 395/551 |
| 5,694,065 | 12/1997 | Hamasaki et al. | 327/108 |
| 5,708,611 | 1/1998 | Iwamoto | 365/233 X |

| | | | |
|---|---|---|---|
| 5,712,580 | 1/1998 | Baumgartner et al. | 327/12 |
| 5,719,508 | 2/1998 | Daly | 327/12 |
| 5,740,123 | 4/1998 | Uchida | 365/233 |
| 5,751,665 | 5/1998 | Tanoi | 368/120 |
| 5,767,715 | 6/1998 | Marquis et al. | 365/233 |
| 5,768,177 | 6/1998 | Sakuragi | 365/194 |
| 5,778,214 * | 7/1998 | Taya et al. | 713/400 |
| 5,781,499 | 7/1998 | Koshikawa | 365/233 |
| 5,784,422 | 7/1998 | Heermann | 375/355 |
| 5,789,947 | 8/1998 | Sato | 327/3 |
| 5,790,612 | 8/1998 | Chengson et al. | 375/373 |
| 5,805,931 | 9/1998 | Morzano et al. | 710/64 |
| 5,812,619 | 9/1998 | Runaldue | 375/376 |
| 5,822,314 | 10/1998 | Chater-Lea | 370/337 |
| 5,831,929 | 11/1998 | Manning | 365/233 |
| 5,841,707 | 11/1998 | Cline et al. | 365/194 |
| 5,852,378 | 12/1998 | Keeth | 327/171 |
| 5,872,959 * | 2/1999 | Nguyen et al. | 395/552 |
| 5,889,829 | 3/1999 | Chiao et al. | 375/376 |
| 5,898,674 | 4/1999 | Mawhinney et al. | 370/247 |
| 5,917,760 | 6/1999 | Millar | 365/194 |
| 5,920,518 | 7/1999 | Harrison et al. | 365/233 |
| 5,926,047 | 7/1999 | Harrison | 327/159 |
| 5,926,436 | 7/1999 | Toda et al. | 365/236 |
| 5,940,608 * | 8/1999 | Manning | 713/503 |
| 5,940,609 | 8/1999 | Harrison | 395/559 |
| 5,946,244 | 8/1999 | Manning | 365/194 |
| 5,953,284 | 9/1999 | Baker et al. | 365/233 |
| 5,964,884 | 10/1999 | Partovi et al. | 713/503 |
| 5,990,719 | 11/1999 | Dai et al. | 327/244 |
| 6,005,823 | 12/1999 | Martin et al. | 365/230.08 |
| 6,011,732 | 1/2000 | Harrison et al. | 365/194 |
| 6,016,282 | 1/2000 | Keeth | 365/233 |
| 6,026,050 | 2/2000 | Baker et al. | 635/233 |
| 6,029,250 | 2/2000 | Keeth | 713/400 |
| 6,038,219 | 3/2000 | Mawhinney et al. | 370/242 |
| 6,067,592 * | 5/2000 | Farmwald et al. | 710/104 |
| 6,101,152 | 8/2000 | Farmwald et al. | 365/233 |
| 6,101,197 | 8/2000 | Keeth et al. | 370/517 |
| 6,105,157 | 8/2000 | Miller | 714/744 |
| 6,160,423 | 12/2000 | Haq | 327/41 |

FOREIGN PATENT DOCUMENTS

| | | |
|---|---|---|
| 0 680 049 A2 | 11/1995 | (EP). |
| 0 704 848 A2 | 4/1996 | (EP). |
| 0 704 975 A1 | 4/1996 | (EP). |
| 0 767 538 A1 | 4/1997 | (EP). |
| 2-112317 | 4/1990 | (JP). |
| 4-135311 | 5/1992 | (JP). |
| 5-136664 | 6/1993 | (JP). |
| 5-282868 | 10/1993 | (JP). |
| WO 94/29871 | 12/1994 | (WO). |
| WO 95/22200 | 8/1995 | (WO). |
| WO 95/22206 | 8/1995 | (WO). |
| WO 96/10866 | 4/1996 | (WO). |
| WO 97/14289 | 4/1997 | (WO). |
| WO 97/42557 | 11/1997 | (WO). |

OTHER PUBLICATIONS

Arai, Y. et al., "A CMOS Four Channel x 1K Time Memory LSI with 1–ns/b Resolution", IEEE Journal of Solid–State Circuits, vol. 27, No. 3, M, 8107 Mar., 1992, No. 3, New York, US, pp. 359–364 and 528–531.

Arai, Y. et al., "A Time Digitizer CMOS Gate–Array with a 250 ps Time Resolution", XP000597207, IEEE Journal of Solid–State Circuits, vol. 31, No. 2, Feb. 1996, pp. 212–220.

Bazes, M., "Two Novel Fully Complementary Self–Biased CMOS Differential Amplifiers", IEEE Journal of Solid–State Circuits, vol. 26, No. 2, Feb. 1991, pp. 165–168.

Chapman, J. et al., "A Low–Cost High–Performance CMOS Timing Vernier for ATE", IEEE International Test Conference, Paper 21.2, 1995, pp. 459–468.

Cho, J. "Digitally–Controlled PLL with Pulse Width Detection Mechanism for Error Correction", ISSCC 1997, Paper No. SA 20.3, pp. 334–335.

Christiansen, J., "An Integrated High Resolution CMOS Timing Generator Based on an Array of Delay Locked Loops", IEEE Journal of Solid–State Circuits, vol. 31, No. 7, Jul. 1996, pp. 952–957.

Combes, M. et al., "A Portable Clock Multiplier Generator Using Digital CMOS Standard Cells", IEEE Journal of Solid–State Circuits, vol. 31, No. 7, Jul. 1996, pp. 958–965.

Descriptive literature entitled, "400MHz SLDRAM, 4M X 16 SLDRAM Pipelined, Eight Bank, 2.5 V Operation," SLDRAM Consortium Advance Sheet, published throughout the United States, pp. 1–22.

Donnelly, K. et al., "A 660 MB/s Interface Megacell Portable Circuit in 0.3 $\mu$m–0.7 $\mu$m CMOS ASIC", IEEE Journal of Solid–State Circuits, vol. 31, No. 12, Dec. 1996, pp. 1995–2001.

"Draft Standard for a High–Speed Memory Interface (SyncLink)", Microprocessor and Microcomputer Standards Subcommittee of the IEEE Computer Society, Copyright 1996 by the Institute of Electrical and Electronics Engineers, Inc., New York, NY, pp. 1–56.

Goto, J. et al., "A PLL–Based Programmable Clock Generator with 50– to 350–MHz Oscillating Range for Video Signal Processors", IEICE Trans. Electron., vol. E77–C, No. 12, Dec. 1994, pp. 1951–1956.

Hamamoto, T., "400–MHz Random Column Operating SDRAM Techniques with Self–Skew Compensation", IEEE Journal of Solid–State Circuits, vol. 33, No. 5, May 1998, pp. 770–778.

Ishibashi, A. et al., "High–Speed Clock Distribution Architecture Employing PLL for 0.6$\mu$m CMOS SOG", IEEE Custom Integrated Circuits Conference, 1992, pp. 27.6.1–27.6.4.

Kim, B. et al., "A 30MHz High–Speed Analog/Digital PLL in 2$\mu$m CMOS", ISSCC, Feb. 1990.

Kikuchi, S. et al., "A Gate–Array–Based 666MHz VLSI Test System", IEEE International Test Conference, Paper 21.1, 1995, pp. 451–458.

Ko, U. et al., "A 30–ps Jitter, 3.6–$\mu$s Locking, 3.3–Volt Digital PLL for CMOS Gate Arrays", IEEE Custom Integrated Circuits Conference, 1993, pp. 23.2.1–23.3.4.

Lee, T. et al., "A 2.5V Delay–Locked Loop for an 18Mb 500MB/s DRAM", IEEE International Solid–State Circuits Conference Digest of Technical Papers, Paper No. FA 18.6, 1994, pp. 300–301.

Lesmeister, G., "A Densely Integrated High Performance CMOS Tester", International Test Conference, Paper 16.2, 1991, pp. 426–429.

Ljuslin, C. et al., "An Integrated 16–channel CMOS Time to Digital Converter", IEEE Nuclear Science Symposium & Medical Imaging Conference Record, vol. 1, 1993, pp. 625–629.

Maneatis, J., "Low–Jitter Process–Independent DLL and PLL Based on Self–Biased Techniques", IEEE Journal of Solid–State Circuits, vol. 31, No. 11, Nov. 1996, pp. 1723–1732.

Nakamura, M. et al., "A 156 Mbps CMOS Clock Recovery Circuit for Burst–mode Transmission", Symposium on VLSI Circuits Digest of Technical Papers, 1996, pp. 122–123.

Nielson, E., "Inverting latches make simple VCO", EDN, Jun. 19, 1997.

Novof, I. et al., "Fully Integrated CMOS Phase–Locked Loop with 15 to 240 MHz Locking Range and ±50 ps Jitter", IEEE Journal of Solid–State Circuits, vol. 30, No. 11, Nov. 1995, pp. 1259–1266.

Santos, D. et al., "A CMOS Delay Locked Loop And Sub–Nanosecond Time–to–Digital Converter Chip", IEEE Nuclear Science Symposium and Medical Imaging Conference Record, vol. 1, Oct. 1995, pp. 289–291.

Saeki, T. et al., "A 2.5–ns Clock Access, 250–MHz, 256–Mb SDRAM with Synchronous Mirror Delay", IEEE Journal of Solid–State Circuits, vol. 31, No. 11, Nov. 1996, pp. 1656–1665.

Shirotori, T. et al., "PLL–based, Impedance Controlled Output Buffer", 1991 Symposium on VLSI Circuits Digest of Technical Papers, pp. 49–50.

Sidiropoulos, S. et al., "A 700–Mb/s/pin CMOS Signaling Interface Using Current Integrating Receivers", IEEE Journal of Solid–State Circuits, vol. 32, No. 5, May 1997, pp. 681–690.

Sidiropoulos, S. et al., "A CMOS 500 Mbps/pin synchronous point to point link interface", IEEE Symposium on VLSI Circuits Digest of Technical Papers, 1994, pp. 43–44.

Sidiropoulos, S. et al., "A Semi–Digital DLL with Unlimited Phase Shift Capability and 0.08–400MHz Operating Range," IEEE International Solid State Circuits Conference, Feb. 8, 1997, pp. 332–333.

Soyuer, M. et al., "A Fully Monolithic 1.25GHz CMOS Frequency Synthesizer", IEEE Symposium on VLSI Circuits Digest of Technical Papers, 1994, pp. 127–128.

Taguchi, M. et al., "A 40–ns 64–Mb DRAM with 64–b Parallel Data Bus Architecture", IEEE Journal of Solid–State Circuits, vol. 26, Nov. 1991, pp. 1493–1497.

Tanoi, S. et al., "A 250–622 MHz Deskew and Jitter–Suppressed Clock Buffer Using a Frequency– and Delay–Locked Two–Loop Architecture", 1995 Symposium on VLSI Circuits Digest of Technical Papers, vol. 11, No. 2, pp. 85–86.

Tanoi, S. et al., "A 250–622 MHz Deskew and Jitter–Suppressed Clock Buffer Using Two–Loop Architecture", IEEE IEICE Trans. Electron., vol. E–79–C. No. 7, Jul. 1996, pp. 898–904.

von Kaenel, V. et al., "A 320 MHz,1.5 m W @ 1.35 V CMOS PLL for Microprocessor Clock Generation", IEEE Journal of Solid–State Circuits, vol. 31, No. 11, Nov. 1996, pp. 1715–1722.

Watson, R. et al., "Clock Buffer Chip with Absolute Delay Regulation Over Process and Environmental Variations", IEEE Custom Integrated Circuits Conference, 1992, pp. 25.2.1–25.2.5.

Yoshimura, T. et al. "A 622–Mb/s Bit/Frame Synchronizer for High–Speed Backplane Data Communication", IEEE Journal of Solid–State Circuits, vol. 31, No. 7, Jul. 1996, pp. 1063–1066.

* cited by examiner

METHOD AND APPARATUS FOR ADJUSTING DATA TIMING BY DELAYING CLOCK SIGNAL

TECHNICAL FIELD

This invention relates to clocked integrated circuits that deliver data, and more particularly to a method and apparatus for adjusting the timing of data presented to an output terminal relative to a clock signal.

BACKGROUND OF THE INVENTION

Clock signals are used by a wide variety of digital circuits to control the timing of various events occurring during the operation of the digital circuits. For example, clock signals are used to designate when command signals, data signals, and other signals used in memory devices and other computer components are valid and can thus be used to control the operation of the memory device or computer system. For instance, a clock signal can be used to develop sequential column addresses when an SDRAM is operating in burst mode.

Retrieving valid data from a clocked memory device at a specified time can be difficult to coordinate. After a memory address is selected, the data travels out of the selected memory cell, is amplified, passes through configuration circuitry (if the memory chip has multiple configurations) and passes through an output buffer before the data is read. Before the advent of synchronous memory circuits, data simply appeared at an output terminal following a propagation delay after the data was requested. In a synchronous memory circuit, data delivery is synchronized with a clock signal. Many circuits have been created to coordinate data signals with clock signals, with varying degrees of success. Two of the problems to solve are determining how fast and with what regularity the data signal propagates through the chip circuitry. Because data output is often coordinated with a clock signal that is external to the memory chip, computer simulations of signal propagation within a chip are performed to align the external clock signal with the data delay of the synchronous memory device. Static time delays are then designed into the memory circuit based on the simulation predictions. Because of production variations, improper assumptions, and other factors ultimately causing timing errors, the data does not always arrive at the output terminal at the desired time. As computer clock speeds increase, the window for providing valid data to the output terminal closes, making it more difficult to ensure the correct delivery time of data from the memory circuit.

An example of a circuit that provides data to a data pad at a specific time relative to an external clock is shown in FIG. 1. An output circuit 2 includes a memory array 5 that contains an array of individual memory cells (not shown). Once a particular memory cell is selected to be read, complementary signals corresponding to the contents of the memory cell travel to a pair of respective I/O and I/O* lines. The signals on the I/O and I/O* lines are sensed and amplified by a data sensing circuit 10, which produces a DATA* signal at an output. An external clock signal is received at a clock circuit input 7 and passes through clock circuitry 15 to become a CLKDOR* signal. The CLKDOR* signal may differ from the external clock signal in a variety of ways, including phase, orientation, and duty cycle, however, their overall periodic cycle length is the same. Oftentimes, to properly match timing of the data arriving at the data pad with the external clock signal, a static delay is added within the clock circuitry 15.

The DATA* signal is presented to a passgate 20 and passed to an output node 21 when the signal CLKDOR* signal is HIGH and its complement from an inverter 17 is LOW. From the output node 21, the DATA* signal is input to a NOR gate 30 along with a TRISTATE signal. An output from the NOR gate 30 leads to a passgate 24. When the CLKDOR* signal is LOW and its complement from the inverter 17 is HIGH, the output from the NOR gate 30 passes through the passgate 24 and becomes the signal DQHI. Another NOR gate 32 combines the output of the NOR gate 30 with the TRISTATE signal. This output from the NOR gate 32 is presented to a pair of passgates 22, 26. The passgate 22 receives the signal from the NOR gate 32 and, when the CLKDOR* signal is LOW and its complement from the inverter 17 is HIGH, feeds it back to the output node 21. The passgate 26 passes the signal it receives from the NOR gate 32 as an output signal DQLO when the signal CLKDOR* is LOW and its complement from the inverter 17 is HIGH.

If the signal DQHI is HIGH, a pull-up circuit 36 raises a DQ pad 40 to a HIGH voltage. Conversely, if DQLO is HIGH, it activates a pull-down circuit 38 to pull the DQ pad 40 to a ground voltage. The output circuit 2 is designed so that the pull-up circuit 36 and the pull-down circuit 38 cannot operate simultaneously. When neither the pull-up circuit 36 nor the pull-down circuit 38 is active, the DQ pad 40 is neither pulled up to a HIGH voltage nor pulled down to ground, but instead remains in a high-impedance state.

The circuit operation of the data delivery circuit 2 will now be explained. When the CLKDOR* signal is HIGH and the DATA* signal is HIGH, a HIGH signal passes to the output node 21. Assuming that the TRISTATE signal is low to enable the NOR gates 30 and 32 so they act as inverters, when the CLKDOR* signal goes LOW, the passgate 22 couples the output of the NOR gate 32 to the input of the NOR gate 30, output node 21. The NOR gates 30 and 32 then latch the HIGH at the output node 21 to the output of the NOR gate 32. At the same time, a LOW is latched to the output of the NOR gate 30. The HIGH at the output of the NOR gate 32 is coupled through the passgate 26 to the pull-down circuit 38. The HIGH signal DQLO causes the pull-down circuit 38 to pull the DQ pad 40 to ground. At the same time, the LOW signal at the output of the NOR gate 30 passes through the passgate 24. The LOW DQHI signal does not activate the pull-up circuit 36, as explained above. Alternatively, if the DATA* signal is LOW, a LOW signal is passed to the output node 21 when the CLKDOR* signal is HIGH. When the CLKDOR* signal drops LOW, the LOW signal at the output node 21 is latched by the NOR gates 30 and 32, is fed back to the output node 21 through the passgate 22, and also propagates through the passgate 26 to make DQLO LOW. Concurrently, the LOW signal at the data output node 21 causes the NOR gate 30 to output a HIGH signal that passes through the passgate 24 to provide a HIGH DQHI signal. The HIGH DQHI signal causes the pull-up circuit 36 to connect the DQ pad 40 to a HIGH voltage. If the TRISTATE signal is HIGH, neither DQHI nor DQLO will be HIGH regardless of the state of the DATA* signal. Thus, the DQ pad 40 floats in a high impedance state.

When a computer system is designed, specifications for signal timing are determined. Some of the signals and timings used in the design are shown in FIG. 2. One of the design specifications is an access time, $T_{AC}$, used to designate a maximum time between a rising edge of an external clock signal and when a valid data signal arrives at the DQ pad 40. Additionally, another specified time parameter is the output hold time, $T_{OH}$, indicative of a minimum time for how long the data will be held at the DQ pad 40 following a subsequent rising edge of the external clock. For example, as illustrated in FIG. 2, a READ command signal is input to a memory circuit sometime between a rising edge of a clock pulse CP0 and a clock pulse CP1. At a time CP1, the READ command is latched and read by the memory circuit, indicating data is to be read from a memory cell in a memory array. The data is read from the array and placed at the DQ pad 40 under the control of the CLKDOR* signal. The specification $T_{AC}$ indicates a maximum time until the desired data is placed on the DQ pad 40. The data is held at the DQ pad 40 for a time no less than the specification $T_{OH}$, as measured from a subsequent clock pulse after the READ command is latched. As shown in FIG. 2, $T_{AC1}$ is the time measured from CP2 until Data$_1$, is stable on the DQ line. $T_{AC2}$ is the time measured from CP3 until Data$_2$ is stable on the DQ line, and so on. The time $T_{AC1}$ will be nearly identical to the other access times $T_{AC2}$, $T_{AC3}$, etc. under the same operating conditions. Also shown in FIG. 2, $T_{OH1}$ is the time measured from the next clock pulse following when Data , appears on the DQ line, i.e., CP3, to the time when Data$_1$ begins to transition off the DQ line. As above, the measured hold times $T_{OH2}$, TOH$_3$, etc. will be nearly identical to one another under similar operating conditions.

During the design phase of a memory chip, a designer determines how much after each clock pulse the CLKDOR* signal should fire. This delay determines when the data is made available on the DQ line relative to the external clock signal. Typically, a delay value is chosen that provides a tolerance for both the $T_{AC}$ and $T_{OH}$ parameters. If the CLKDOR* signal fires too soon after the external clock signal, the chip will easily pass the $T_{AC}$ specification, but may fail the $T_{OH}$ specification. If the CLKDOR* signal fires too late, the chip will easily pass the $T_{OH}$ specification but may fail the $T_{AC}$ specification. These time compensations, by virtue of being fabricated as part of the circuit, generally cannot be changed after manufacture of an integrated circuit. When memory chips fail their timing specifications, they are sold as lesser quality chips for a reduced price, or even destroyed. Thus, there is an economic incentive to maximize the number of chips that meet or exceed the timing specifications. As a consequence of increasing computer speeds, this already small window for proper data timing is reducing. Because of process variations, errors in design assumptions, the wide range of temperatures and voltages in which the chips are warrantied to perform, and other factors, an increasing number of memory chips fail to meet the increasingly stringent design specifications.

SUMMARY OF THE INVENTION

An adjustable data delay circuit comprises a clocked data passing circuit that receives a clock signal and a data signal. An adjustable time delay circuit is coupled to the clock signal for adjusting the time the data is delivered to an output terminal relative to the clock signal. The adjustable time delay circuit includes a plurality of delay gates, each individually selected by control signals. One path in the time delay circuit that includes the desired delay gate is selected by the control signals. The clock signal passing through the selected delay gate is then used to control the time when the data is delivered to the output terminal.

In one embodiment, the control signals are made by selectively coupling a pattern of control inputs to a reference voltage.

In another embodiment, the passgates are arranged in a plurality of columns such that each column has a number of passgates that is an integer power of 2.

DETAILED DESCRIPTION OF THE INVENTION

Figure 1:
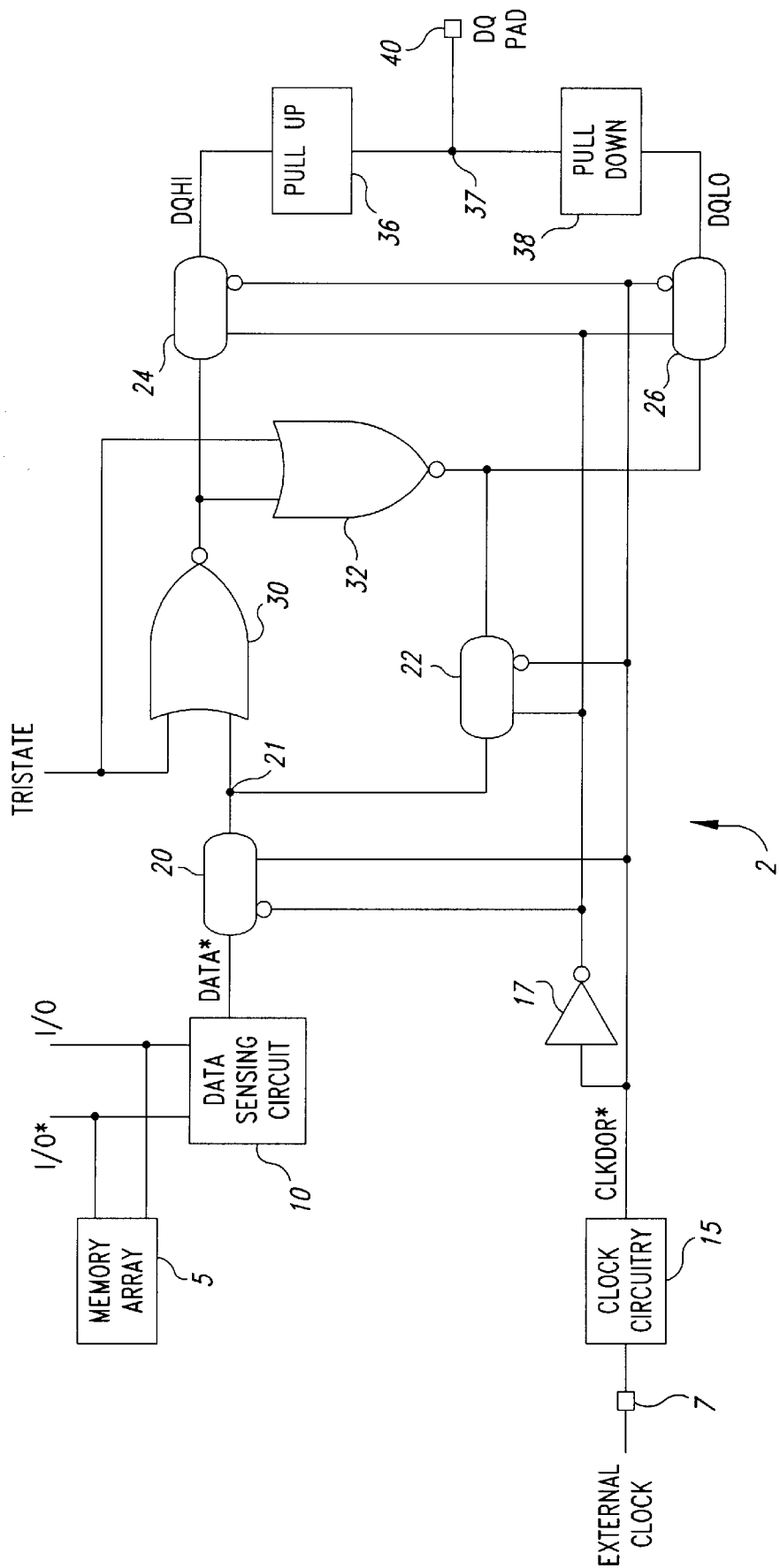
FIG. 1 is a schematic diagram of a conventional clocked data delivery circuit.
Figure 3:
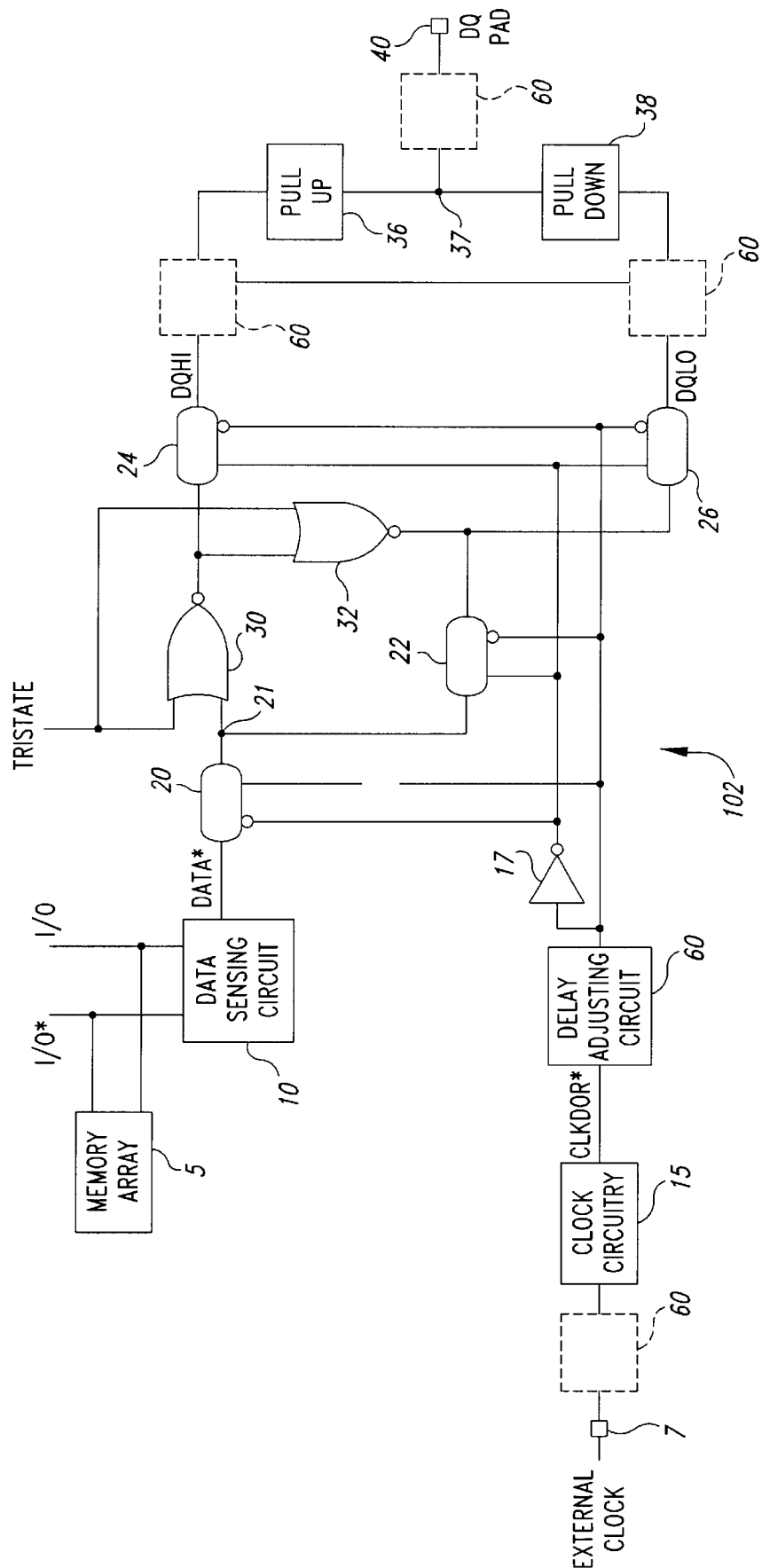
FIG. 3 is a schematic diagram of an adjustable clocked data circuit according to one embodiment of the present invention.

One embodiment of an adjustable time delay circuit 102 in accordance with the invention is illustrated in the schematic diagram of FIG. 3. The adjustable delay circuit 102 includes some of the same components as the output circuit 2, shown in FIG. 1. Identical components of the output circuit 2 and the adjustable time circuits 102 have been given the same reference numbers, and for the sake of brevity, identical components will not be described in further detail. The adjustable time data circuit 102 includes a delay adjusting circuit 60 located between the clock circuitry 15 and the control inputs to the passgates 20, 22, 24, and 26. As later described, the delay adjustment circuit 60 can be located in various places in the adjustable delay circuit 102, and is shown in this location of the adjustable delay circuit 102 for illustration.

Figures 4A, 4B:
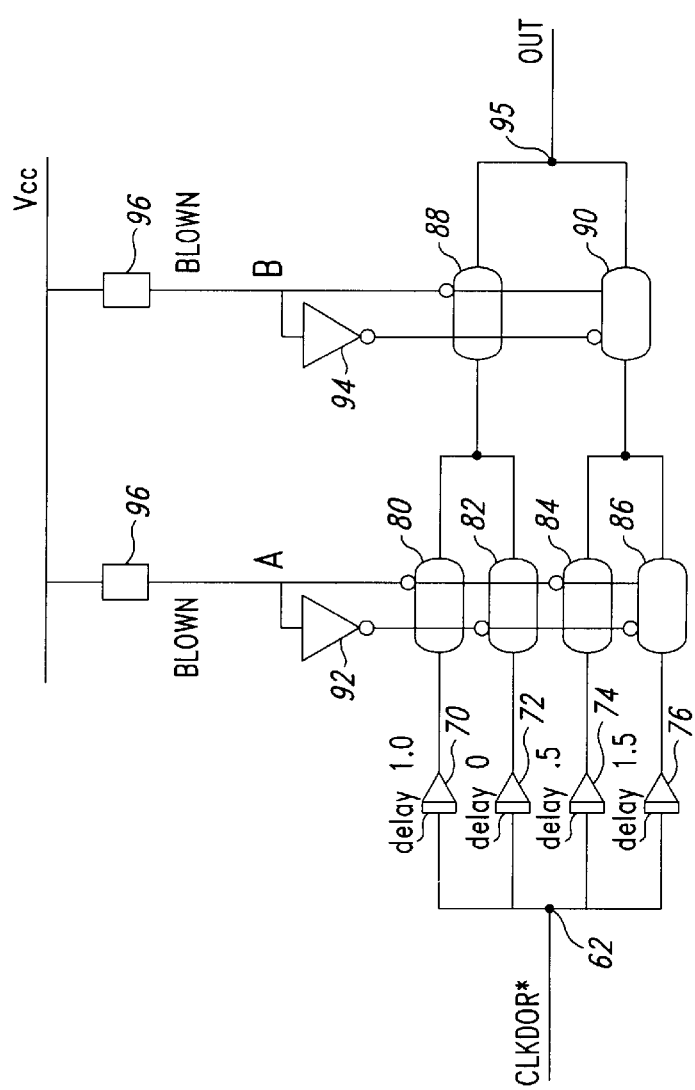
FIG. 4A is a schematic diagram of a delay adjusting circuit according to one embodiment of the present invention.
FIG. 4B is a chart showing how different delay times are selected using one embodiment of the present invention.

As shown in FIG. 4A, the CLKDOR* signal is input to the delay adjusting circuit 60 at an input terminal 62. From there it is split into four paths, passing through a delay circuit 70, having a delay of 1.0; a delay circuit 72, having a delay of 0; a delay circuit 74, having a delay of 0.5; and a delay circuit 76, having a delay of 1.5. The delay times 0, 0.5, 1.0, and 1.5 are an indication of relative measure and do not necessarily indicate a specific time period. These delay times are selected such that the delay that would have been designed into the output circuit 2 appears as a middle value of the range of delay values eligible for selection. In this way, the data delivery of a memory chip can be "accelerated" by selecting a delay time shorter than the built-in delay of the prior art circuit, or "decelerated" by selecting a delay time longer than the built-in delay of the prior art circuit. The output signals from the delay circuits 70, 72, 74, and 76 are input to a passgate 80, a passgate 82, a passgate 84, and a passgate 86, respectively. The passgates 80, 82, 84, and 86 are controlled by a control signal A and its complement formed by passing A through an inverter 92. The signals from the passgates 80 and 82 combine as an input to a passgate 88, and the signals from the passgates 84 and 86 combine as an input to a passage 90. The outputs from passgates 88 and 90 connect at an output terminal 95, and form an output signal OUT. The passgates 88, and 90 are controlled by a control signal B and its complement formed by passing B through an inverter 94.

Figure 2:
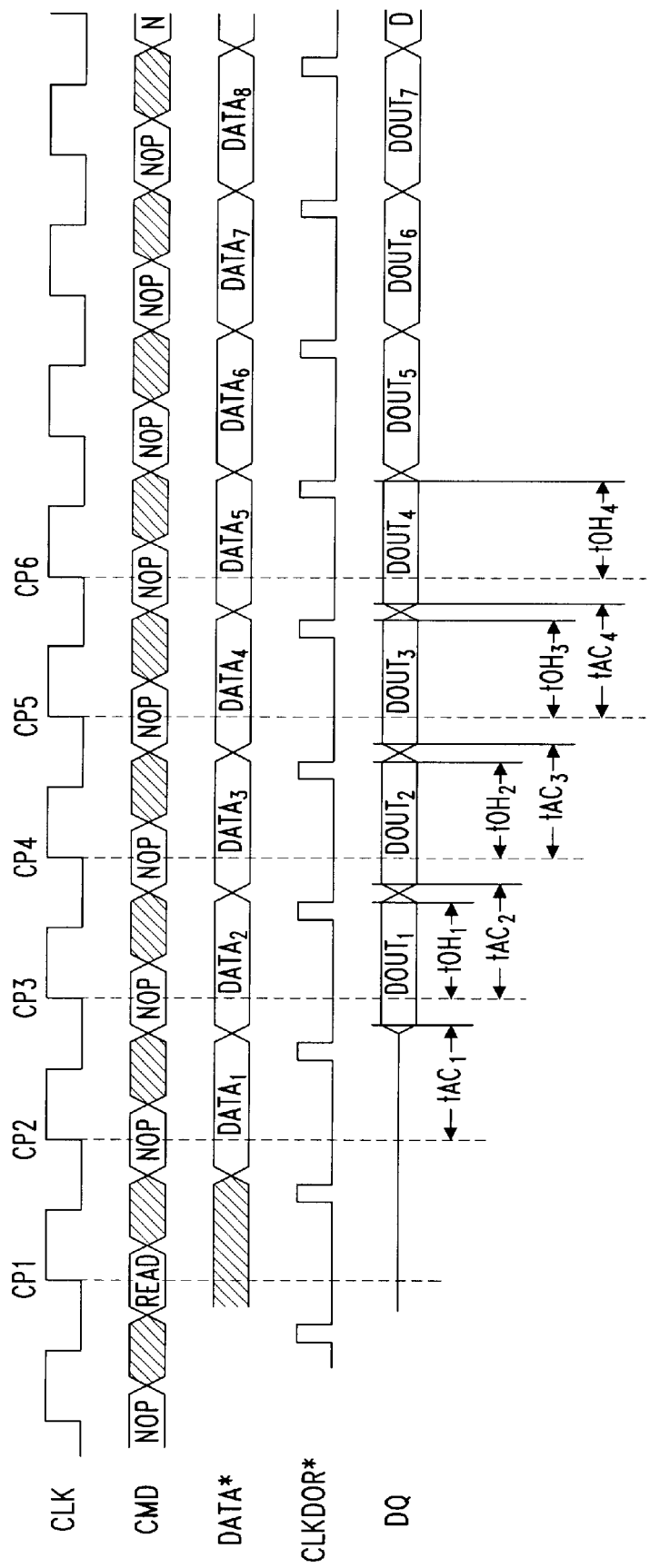
FIG. 2 is a timing diagram of various signals during the operation of the clocked data circuit of FIG. 1.

Referring back to FIG. 2, the benefits of having an adjustable CLKDOR* signal will be described. As previously stated, adding delay to the CLKDOR* signal in relation to the CLK signal allows the designer to provide a tolerance for the $T_{AC}$ and $T_{OH}$ specifications. After the chip is produced, the $T_{AC}$ and $T_{OH}$ specifications, and others, are tested. If the chip does not pass all of the specifications, it cannot be sold at the current market price for the highest quality chips. By including an adjustable timing circuit within the memory chip, chips that do not meet the $T_{AC}$ and $T_{OH}$ specifications after manufacture may be able to be adjusted in order to meet the specifications.

For example, the specifications may direct that $T_{AC}$ can be no more than 6 ns and $T_{OH}$ cannot be less than 3 ns. Assume that $T_{AC1}$ measured 4 ns and $T_{OH1}$ measured 2.5 ns. The specification for $T_{AC}$ is easily passed (the shorter the better), but the chip fails the $T_{OH}$ specification because it does not hold the data for a long enough time on the DQ lines. By adding a 1 ns delay to the time when the CLKDOR* signal fires, the chip can be brought within the specifications. The $T_{AC1}$ increases to 5 ns (still passing the 6 ns specification) and the $T_{OH1}$ increases to hold the data valid on the DQ lines for 3.5 ns, passing the 3 ns specification.

The delay adjusting circuit 60 of FIG. 4A is controlled by control signals A and B. These control signals provide a HIGH or LOW signal to the passgates depending on a state of a respective adjustable impedance circuit 96. Two different kinds of adjustable impedance devices are shown, one in FIG. 5A and one in FIG. 5B. One type of adjustable impedance circuit 96 is a circuit containing an antifuse 65, shown in FIG. 5A. The antifuse 65 is made from a pair of conducting plates 110 and 112 separated by a dielectric material 115. Antifuses are devices similar to small capacitors. They have a natural and a blown state. When the antifuse 65 is in a natural state, the dielectric material 115 electrically insulates the pair of plates 110 and 112. Because the dielectric material 115 is intact, the node C is electrically insulated from the ground voltage. To change the antifuse 65 to its blown state, a high electric field is passed across the dielectric material 115 by raising $C_{gnd}$ to a programming voltage, for example, 10 volts, while enabling a PROGRAM transistor. This is usually done after chip fabrication and packaging, but can be completed before packaging. When the high electric field is placed across the dielectric material 115, it breaks down and loses its insulative properties. This allows the plates 110 and 112 to contact one another creating a relatively low resistive contact. When blown, the antifuse 65 couples the node C to the node $C_{gnd}$, that is normally held at the ground voltage, unless the antifuse is being programmed, as described above. To test the state of the antifuse 65 a Read* signal is strobed LOW. That connects node C to the Vcc voltage. If the antifuse 65 is blown, the node C is quickly brought down to ground. An inverter 50 causes a HIGH signal to be sent to a BLOWN output. The HIGH signal also keeps a HOLD transistor OFF. Conversely, if the antifuse 65 is in its natural state, node C will not be pulled down to ground and BLOWN will carry a LOW signal. This low signal also enables the HOLD transistor, keeping node C at the voltage Vcc.

Figure 5A:
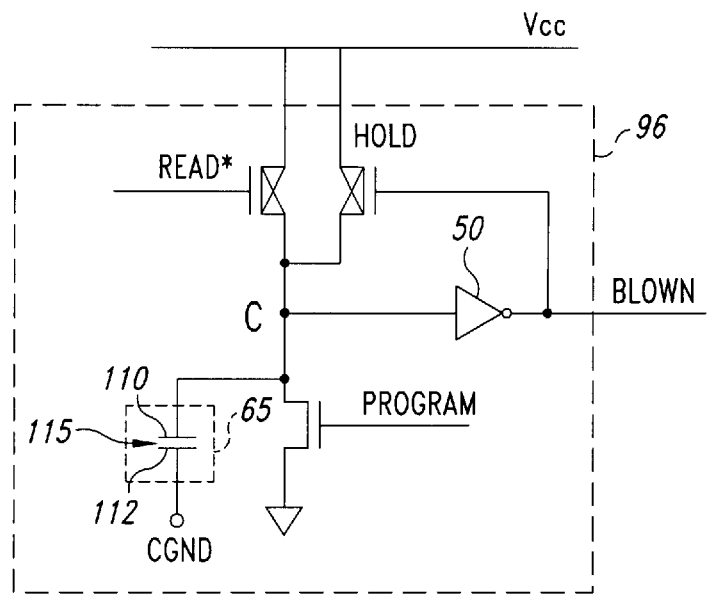
FIG. 5A is a schematic diagram of a conventional adjustable impedance device.
Figure 5B:
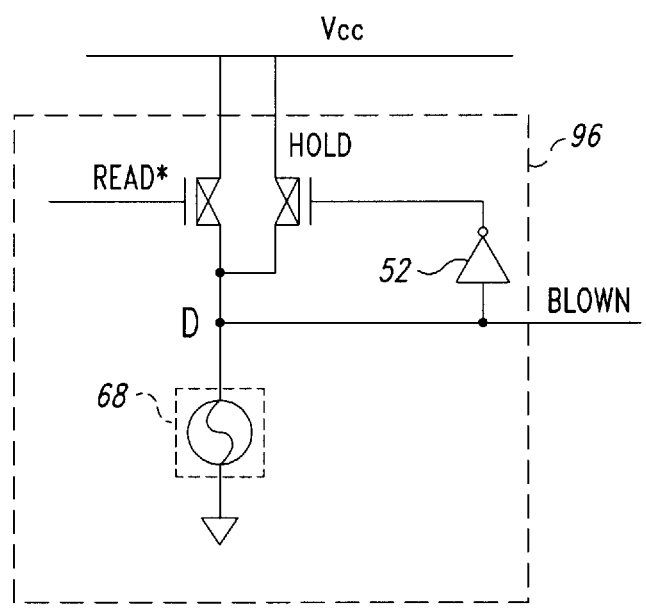
FIG. 5B is a schematic diagram of another conventional adjustable impedance device.

The other adjustable impedance circuit 96, shown in FIG. 5B contains a fuse 68. The fuse 68 also has a natural and a blown state. In its natural state, the fuse 68 couples a node D to the ground voltage. The fuse 68 is blown by passing a high current through it, or by some other means such as cutting it with a laser, for example. When the fuse 68 is blown, the node D is disconnected from the ground voltage. As with the antifuse 65, the fuse 68 may be blown before or after packaging. Also as described above, the adjustable impedance circuit 96 of FIG. 5B is read in a similar manner. The Read* signal strobes LOW raising a node D to the Vcc voltage. If the fuse 68 is intact, node D is coupled to ground and BLOWN is LOW. This LOW signal passes through an inverter 52 to keep the HOLD transistor OFF. If the fuse is blown, node D is charged to Vcc and BLOWN is pulled HIGH.

Referring back to FIG. 4A, the adjustable impedance circuits 96 may be either of the structures shown in FIGS. 5A or 5B. By coupling the signals A and B to a voltage using antifuses 65 or fuses 68, the manufacturer can easily select the signals A and B to be either HIGH or LOW, as desired. Although described here as controlling only one adjustable delay circuit 102, a single delay adjusting circuit 60 may be used to adjust any or all of the adjustable delay circuits within a memory chip, thereby controlling the data delivery time at any or all of the DQ pads on the memory chip.

The operation of the delay adjusting circuit 60 will now be described. In operation, one of the four delay times is selected through the states of signals A and B, as shown in the chart in FIG. 4B. If A and B are each connected to respective adjustable impedance circuits 96 that are BLOWN, both A and B will be HIGH, indicated as "1" in FIG. 4B. This places the passgates 82, 86, and 90 in a passing state. Because the passgates 86 and 90 are passing, the signal CLKDOR* passes through the delay gate 76 having a delay of 1.5, and through the passgates 86 and 90 to the output terminal 95. The CLKDOR* signal also passes through the delay gate 72, having no delay and through the passgate 82, but is blocked at the passgate 88, which is in a blocking state by virtue of a HIGH B signal and a LOW signal received from the inverter 94. By selecting the states of the signals A and B (by selectively adjusting the impedance circuits 96), it is easy to adjust the time delay of a clock signal input to the delay adjusting circuit 60. In one embodiment, the delay time selected by keeping the adjustable impedance circuits 96 in their natural state will be the delay most likely to provide the greatest tolerances for both $T_{AC}$ and $T_{OH}$. In FIG. 4A this desired delay is 1.0. In this way, the majority of the memory chips will pass the $T_{AC}$ and $T_{OH}$ specifications without further adjustment, saving labor and equipment costs. Only in the extraordinary case will the delay need adjustment. Although shown here with only two columns of passgates controlled by the signals A and B, it is apparent that a greater selection of delay times can be made available with the addition of more control signals and more passgates, or that the passgates could have a different configuration. For instance, eight different delay times are efficiently selectable if three control signals are used, with three columns, one each containing two, four and eight passgates.

Although the delay adjusting circuit 60 is shown after the clock circuitry 15, it can appear in many locations in a synchronized memory circuit, some of which are illustrated in FIG. 3. For instance, the delay adjusting circuit 60 can appear directly before the clock circuitry 15. If the delay adjusting circuit 60 is placed after the passgates 24 and 26, the delay adjusting circuit must be implemented in pairs because the data has two separate paths. Only one delay adjusting circuit 60 is needed if it is located between an output terminal 37 and the DQ pad 40. Of course, there are other locations where the delay adjusting circuit 60 could be placed, as long as it is between the clock signal input 7 and the DQ pad 40.

Figure 6:
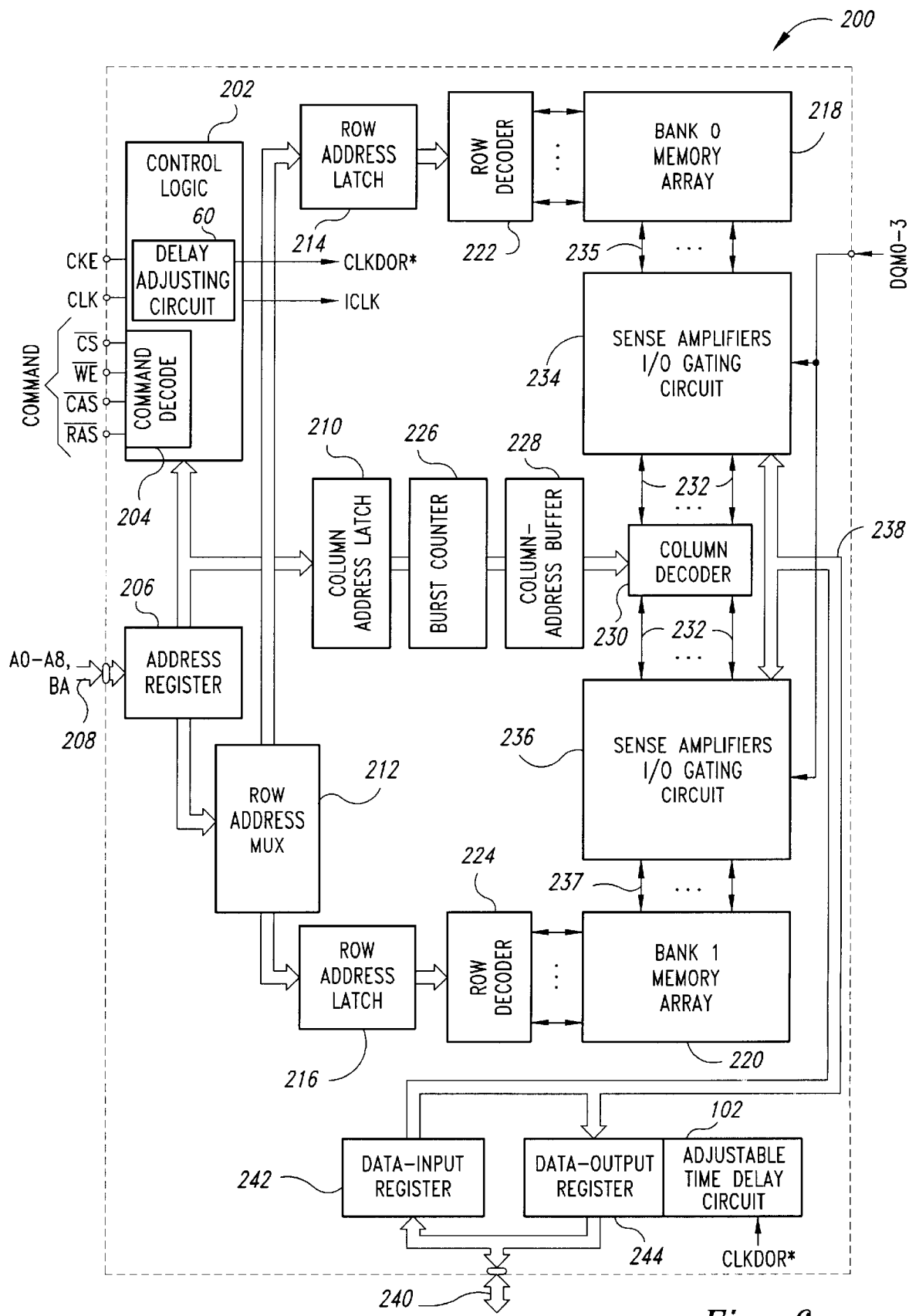
FIG. 6 is a block diagram of a synchronous dynamic random access memory including adjustable time delivery circuit of FIG. 3.

A synchronous dynamic random access memory (SDRAM) 200 using the adjustable time delay circuit 102 of FIG. 3 is shown in FIG. 6. The SDRAM 200 has a control logic circuit 202 receiving a clock signal CLK and a clock enable signal CKE. In the SDRAM 200, all operations are referenced to a particular edge of an internal clock signal ICLK and a data read clock CLKDOR*, both generated from the clock signal CLK. The edge of the ICLK signal that is used is typically the rising edge, while the data read operations are referenced to the falling edge of the CLKDOR*, as known in the art. The delay adjusting circuit 60 is preferably included in the control logic 202 to adjust the timing of the data read clock CLKDOR* relative to the clock signal CLK. In practice, a variety of internal clock signals may be generated from the clock signal CLK, and only some of them may have their timing controlled by the delay adjusting circuit 60. However, in the interest of brevity, only two internal clock signals, ICLK and CLK-DOR* are shown. The control circuit 202 further includes a command decode circuit 204 receiving a number of command signals on respective external terminals of the SDRAM 200. These command signals typically include a chip select signal $\overline{CS}$, write enable signal $\overline{WE}$, column address strobe signal $\overline{CAS}$, and row address strobe signal $\overline{RAS}$. Specific combinations of these signals define particular data transfer commands of the SDRAM 200 such as ACTIVE, PRECHARGE, READ, and WRITE as known in the art. An external circuit, such as a processor or memory controller generates these data transfer commands to read data from and to write data to the SDRAM 200.

The SDRAM 200 further includes an address register 206 operable to latch an address applied on an address bus 208, and output the latched address to the control circuit 202, a column address latch 210, and a row address multiplexer 212. During operation of the SDRAM 200, a row address with a bank address BA and a column address with the bank address are sequentially latched by the address register 206 under control of the control circuit 202. In response to the latched bank address BA and row address, the control circuit 202 controls the row address multiplexer 212 to latch and output the row address to one of a row address latch 214 and 216. The row address latches 214 and 216, when activated, latch the row address from the row address multiplexer 212 and output this latched row address to an associated row decoder circuit 222 and 224, respectively. The row decoder circuits 222 and 224 decode the latched row address and activate a corresponding row of memory cells in memory banks 218 and 220, respectively. The memory banks 218 and 220 each include a number of memory cells (not shown) arranged in rows and columns, each memory cell operable to store a bit of data and having an associated row and column address.

When a column address and bank address BA is applied on the address bus 208, the column address is latched by the address register 206 under control of the control circuit 202, and output to a column address latch 210, which latches the column address and in turn outputs the column address to a burst counter circuit 226. The burst counter circuit 226 operates to develop sequential column addresses beginning with the latched column address when the SDRAM 200 is operating in a burst mode. The burst counter 226 outputs the developed column addresses to a column address buffer 228, which in turn outputs the developed column address to a pair column decoder circuits 230 and 231. The column decoder circuits 230 and 231 decode the column address and activates one of a plurality of column select signals 232 corresponding to the decoded column address. The column select signals 232 are output to sense amplifier and I/O gating circuits 234 and 236 associated with the memory banks 218 and 220, respectively. The sense amplifier and I/O gating circuits 234 and 236 sense and store the data placed on the digit lines 235 and 237, respectively, by the memory cells in the addressed row and to thereafter couple the digit lines 235 or 237 corresponding to the addressed memory cell to an internal data bus 238. The internal data bus 238 is coupled to a data bus 240 of the SDRAM 200 through either a data input register 242 or a data output register 244. In the preferred embodiment, the adjustable time delay circuit 102 is coupled to the data output register 244. This circuit is used to adjust the time data is presented to the data bus in reference to the clock signal CLK. A data mask signal DQM controls the circuits 234 and 236 to avoid data contention on the data bus 240 when, for example, a READ command is followed immediately by a WRITE command, as known in the art.

In operation, during a read data transfer operation, an external circuit, such as a processor, applies a bank address BA and row address on the address bus 208 and provides an ACTIVE command to the command decode circuit 204. This applied address and command information is latched by the SDRAM 200 on the next rising edge of the clock signal CLK, and the control circuit 202 thereafter activates the addressed memory bank 218 or 220. The supplied row address is coupled through the row address multiplexer 212 to the row address latch 214 or 216 associated with the addressed bank, and this row address is thereafter decoded and the row of memory cells in the activated memory bank 218 or 220 is activated. The sense amplifiers in the sense amplifier and I/O gating circuit 234 or 236 sense and store the data contained in each memory cell in the activated row of the addressed memory bank 218 or 220.

The external circuit thereafter applies a READ command to the command decode circuit 204 including a column address and bank address BA on the address bus 208, both of which are latched on the next rising edge of the clock signal CLK. The latched column address is then routed through the circuits 210, 226, and 228 to the column decoder circuit 230 under control of the control circuit 204. The column decoder 230 decodes the latched column address and activates the column select signal 232 corresponding to that decoded column address. In response to the activated column select signal 232, the sense amplifier and I/O gating circuit 234 or 236 transfers the addressed data onto the internal data bus 238, and the data is then transferred from the internal data bus 238 through the data output register 244 and onto the data bus 240 where it is read by the external circuit.

During a write data transfer operation, after activating the addressed memory bank 218 or 220 and the addressed row within that bank, the external circuit applies a WRITE command to the command decode circuit 204 including a column address and bank address BA on the address bus 208 and data on the data bus 240. The WRITE command, column address, and data are latched respectively into the command decode circuit 204, address register 206 and data input register 242 on the next rising edge of the clock signal CLK or an internal clock signal not generated by the delay adjusting circuit 60. The data latched in the data input register 242 is placed on the internal data bus 238, and the latched column address is routed through the circuits 210, 226, and 228 to the column decoder circuit 230 under control of the control circuit 204. The column decoder 230 decodes the latched column address and activates the column select signal 232 corresponding to that decoded address. In response to the activated column select signal 232, the data on the internal data bus 238 is transferred through the sense amplifier and I/O gating circuit 234 or 236 to the digit lines 235 or 237 corresponding to the addressed memory cell. The row containing the addressed memory cell is thereafter deactivated to store the written data in the addressed memory cell.

Although the adjustable time delay circuit 102 has been described as being used in the SDRAM 200, it will be understood that it may also be used in other types of integrated circuits such as synchronous graphics RAM (SGRAM), or synchronous static RAM (synchronous SRAM). Those skilled in the art realize the differences between SDRAM and other types of memories, and can easily implement the adjustable time delay circuit 102.

Figure 7:
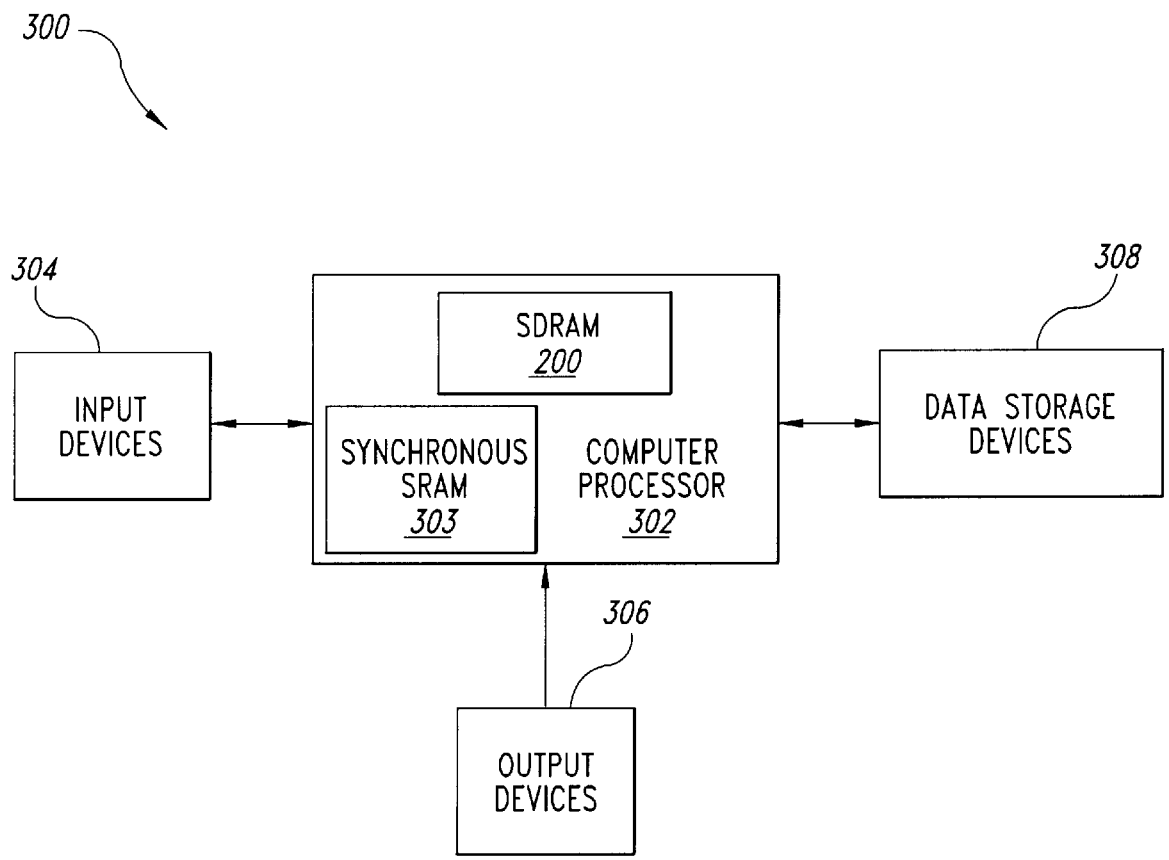
FIG. 7 is a block diagram of a computer system including the random access memory of FIG. 6.

FIG. 7 is a block diagram of a computer system 300 including the SDRAM 200 of FIG. 5. The computer system 300 includes a processor 302 for performing various computing functions, such as executing specific software to perform specific calculations or tasks. Coupled to the processor 302 is a synchronous SRAM circuit 303, used for a memory cache or other memory functions. In addition, the computer system 300 includes one or more input devices 304, such as a keyboard or a mouse, coupled to the processor 302 to allow an operator to interface with the computer system 300. Typically, the computer system 300 also includes one or more output devices 306 coupled to the processor 302, such output devices typically being a printer or a video terminal. One or more data storage devices 308 are also typically coupled to the processor 302 to store data or retrieve data from external storage media (not shown). Examples of typical data storage devices 308 include hard and floppy disks, tape cassettes, compact disk read-only memories (CD-ROMs), and digital videodisk read-only memories (DVD-ROMs). The processor 302 is typically coupled to the SDRAM 200 and to the synchronous SRAM 303 through a control bus, a data bus, and an address bus to provide for writing data to and reading data from the SDRAM and synchronous SRAM. A clocking circuit (not shown) typically develops a clock signal driving the processor 302, SDRAM 200, and synchronous SRAM 303 during such data transfers.

It is to be understood that even though various embodiments and advantages of the present invention have been set forth in the foregoing description, the above disclosure is illustrative only, and changes may be made in detail, and yet remain within the broad principles of the invention. Therefore, the present invention is to be limited only by the appended claims.

What is claimed is:

1. A data delay circuit comprising:

an external clock terminal adapted to receive an external clock signal having a first state and a second state;

an adjustable time delay circuit having a plurality of control inputs each adapted to receive a respective control signal, the time delay circuit adapted to receive the external clock signal at a clock input and pass a delayed clock signal to an output terminal, the time between when the external clock signal changes states and when the delayed clock signal changes states determined by the control signals received at the control inputs, the adjustable time delay circuit including a plurality of passgates coupled in series with respective delay elements, each of the passgates being selectively controlled by at least one of the control signals to control the time between when the external clock signal changes states and when the delayed clock signal changes states; and a data passing circuit receiving both the data signal and the delayed clock signal, the data passing circuit adapted to pass the data signal from the data terminal to a data output terminal after the delayed clock signal changes from the first to the second state.

2. The circuit of claim 1 wherein the control signals are generated by selectively coupling the control inputs to a reference voltage.

3. The circuit of claim 2 wherein each of the control inputs is selectively coupled to a reference voltage using a respective fuse.

4. The circuit of claim 2 wherein each of the control inputs is selectively coupled to a reference voltage using a respective antifuse.

5. The circuit of claim 1 wherein the:

plurality of passgates are arranged in columns, each column having a different number of passgates than any other column in the time delay circuit, the passgates in the column having the highest number of passgates in the delay circuit each coupled to a respective one of the delay elements, and the external clock signal coupled to and passing through each of the delay elements.

6. The circuit of claim 5 wherein one of the delay elements has a null delay value.

7. The circuit of claim 5 wherein each of the columns is coupled to the columns adjacent to it such that one-half of the total number of passgates in each column are coupled to one-half of the total number of passgates in each adjacent column.

8. The circuit of claim 5 wherein the number of control inputs to the delay circuit is n, the number of columns in the time delay circuit is n, and the number of passgates in the column having the highest number of passgates in the delay circuit is $2^n$.

9. The circuit of claim 5 wherein each control signals controls all of the passgates in a respective one of the columns, with one-half of the passgates in the respective column controlled to a passing state and the remainder of the passgates in the respective column controlled to a blocking state responsive to the respective control signal.

10. A clocked-data phase adjustment circuit comprising:

a reference clock terminal adapted to receive a reference clock signal having a first state and a second state;

a data terminal adapted to receive a data signal; and a phase shifting circuit adapted to receive a plurality of control signals, the reference clock signal, and the data signal each at respective inputs, the phase shifting circuit being adapted to adjust the time when the data signal is passed from the data input terminal to a data output terminal responsive to the phase of the reference clock signal, the phase of the reference clock signal being determined by the control signals, the phase shifting circuit including a plurality of passgates coupled in series with respective delay elements, each of the passgates being selectively controlled by at least one of the control signals to control the phase of the reference clock signal.

11. The circuit of claim 10 wherein the control signals are generated by selectively coupling the control inputs to a reference voltage.

12. The circuit of claim 11 wherein each of the control inputs is selectively coupled to a reference voltage using a respective fuse.

13. The circuit of claim 11 wherein each of the control inputs is selectively coupled to a reference voltage using a respective antifuse.

14. The circuit of claim 10 wherein the:

passgates are arranged in columns, each column having a different number of passgates than any other column in the phase shifting circuit, the passgates in the column having the highest number of passgates in the delay circuit each coupled to a respective one of the delay elements, and the external clock signal being coupled to and passing through each of the delay elements.

15. The circuit of claim 14 wherein one of the delay elements has a null delay value.

16. The circuit of claim 14 wherein each of the columns is coupled to the columns adjacent to it such that one-half of the total number of passgates in each column are coupled to one-half of the total number of passgates in each adjacent column.

17. The circuit of claim 14 wherein the number of control inputs to the delay circuit is n, the number of columns in the time delay circuit is n, and the number of passgates in the column having the highest number of passgates in the delay circuit is $2^n$.

18. The circuit of claim 14 wherein each control signals controls all of the passgates in a respective one of the columns, with one-half of the passgates in the respective column in a passing state and the remainder of the passgates in the respective column in a blocking state responsive to the respective control signal.

19. In a synchronous memory circuit, a circuit to adjust output data timing comprising:

an external clock terminal adapted to receive an external clock signal having a first state and a second state;

a clock filtering circuit coupled to the external clock terminal, the clock filtering circuit adapted to modifying the external clock signal into a data clock signal;

a data terminal adapted to receive a data signal;

an adjustable time delay circuit having a plurality of control inputs each receiving a respective control signal, the time delay circuit adapted to receive the data clock signal at a clock input and passing a time adjusted data clock signal to an output terminal, the time between when the data clock signal changes states and when the time adjusted data clock signal changes states determined by the control signals received at the control inputs, the adjustable time delay circuit including a plurality of passgates coupled in series with respective delay elements, each of the passgates being selectively controlled by at least one of the control signals to control the phase of the time adjusted data clock signal relative to the phase of the data clock signal; and a data passing circuit adapted to receive both the data signal and the time adjusted data clock signal, the data passing circuit adapted to pass the data signal from the data terminal to a data output terminal after the time adjusted data clock signal changes from the first to the second state.

20. The circuit of claim 19 wherein the control signals are generated by selectively coupling the control inputs to a reference voltage.

21. The circuit of claim 19 wherein the:

passgates are arranged in columns, each column having a different number of passgates than any other column in the time delay circuit, the passgates in the column having the highest number of passgates in the delay circuit each coupled to a respective one of the delay elements, the external clock signal coupled to and passing through each of the delay elements.

22. The circuit of claim 21 wherein the number of control inputs to the delay circuit is n, the number of columns in the time delay circuit is n, and the number of passgates in the column having the highest number of passgates in the delay circuit is $2^n$.

23. The circuit of claim 19 wherein the synchronous memory circuit is a synchronous static random access memory.

24. A method of adjusting the time that data is delivered to an output terminal of a memory circuit after the memory circuit has been fabricated, the method comprising the steps of:

accepting a data signal at a data input;

accepting a clock signal at a clock input;

selecting a delay time to be added to the clock signal to generate a delayed clock signal, the delay time being selected by selectively coupling control inputs to a control voltage, the control inputs coupled to and controlling a plurality of passgates such that for any single pattern of coupled control inputs, there exists only one path through a controllable delay circuit; and using the delayed clock signal to control the time when the data signal is passed to a data output.

25. The method of claim 24 wherein the delay time selected is one of a plurality of pre-selected delay times.

26. The method of claim 24 wherein the step of selecting a delay time further includes the step of selectively coupling control inputs to a control voltage, the control inputs coupled to and controlling a plurality of the passgates such that for any single pattern of coupled control inputs, there exists only one path through a controllable delay circuit.

* * * * *

UNITED STATES PATENT AND TRADEMARK OFFICE
CERTIFICATE OF CORRECTION

PATENT NO. : 6,269,451 B1
DATED : July 31, 2001
INVENTOR(S) : Patrick J. Mullarkey Page 1 of 1

It is certified that error appears in the above-identified patent and that said Letters Patent is hereby corrected as shown below:

<u>Title page,</u>
Line 46, "23.2.1" should read -- 23.3.1 --

<u>Column 11,</u>
Line 1, please delete "colon"

<u>Column 12,</u>
Line 8, please delete "colon"

Signed and Sealed this

Ninth Day of April, 2002

Attest:

JAMES E. ROGAN
Attesting Officer     Director of the United States Patent and Trademark Office